July 2, 1946.   F. R. JACKSON, JR   2,403,372
THERMAL PROTECTION OF ELECTRIC APPARATUS
Filed May 19, 1943
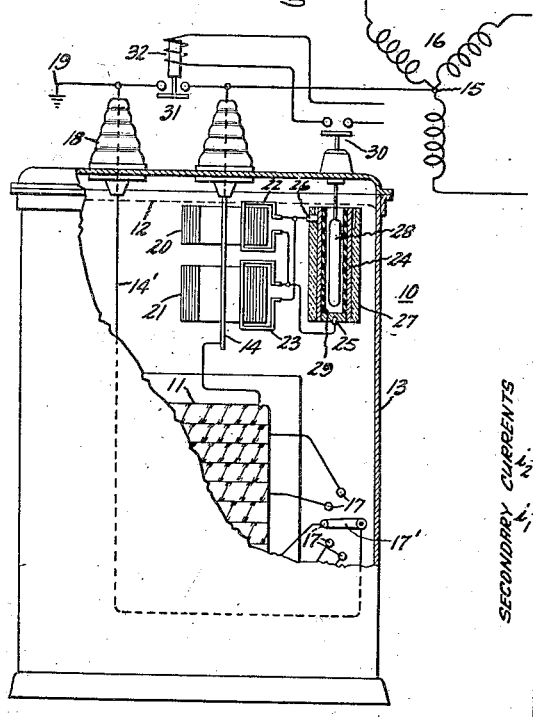
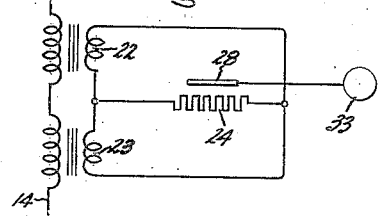
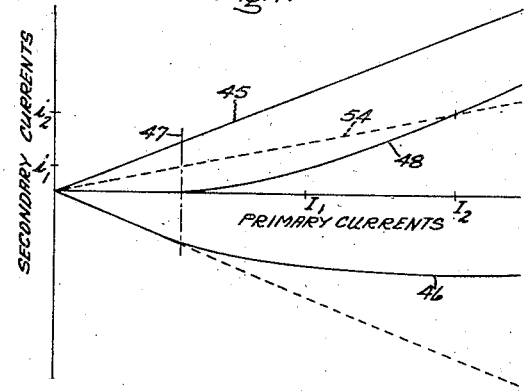
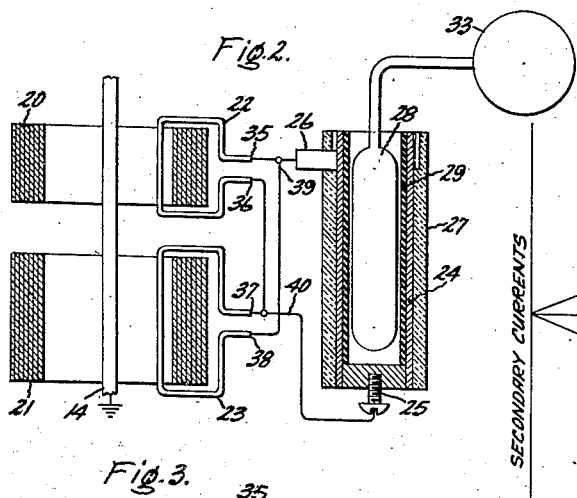
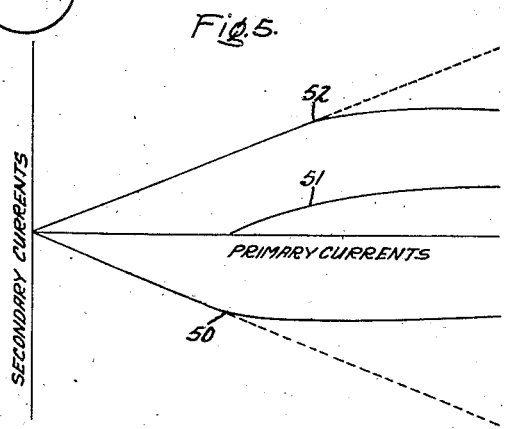
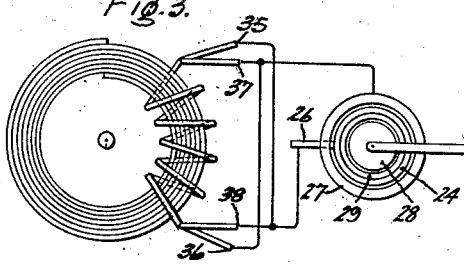
Inventor:
Frederick R. Jackson Jr,
by *Harry E. Dunham*
His Attorney.

Patented July 2, 1946

2,403,372

UNITED STATES PATENT OFFICE 2,403,372

THERMAL PROTECTION OF ELECTRIC APPARATUS

Frederick R. Jackson, Jr., Pittsfield, Mass., assignor to General Electric Company, a corporation of New York Application May 19, 1943, Serial No. 487,602

10 Claims. (Cl. 73—350)

My invention relates to an electric apparatus and to a protected electrical apparatus and to a current responsive device having application to a thermal responsive or hot spot indicator or control device.

Heretofore protected electrical apparatus have had thermal responsive indicators including temperature indicators which are placed thermally close to the winding of the apparatus, the temperature of which is to be indicated. In order to be able to have an indication of the temperature of the windings or the hottest spot of the windings a current transformer has been connected in series with the winding, the current transformer being thermally associated with a temperature responsive device so that the latter may give an indication which is proportional to the current flowing through the winding. This is usually accomplished by having the secondary winding of the current transformer connected in series with a resistor, which resistor is thermally associated with a suitable temperature responsive mechanism and which temperature responsive mechanism is also thermally associated with the cooling medium surrounding the windings the temperature of which is to be indicated. The current, therefore, flowing through the resistor will be proportional to the current flow through the winding, the temperature of which is to be indicated. Thus it will be seen that as long as a current flows through the winding of the electrical apparatus and the primary winding of the current transformer, a proportional current will be continuously flowing through the secondary winding of the current transformer and the resistor which is thermally associated with the temperature indicating device, and a continuous indication may be obtained of the temperature of the apparatus to be protected. This general scheme is found satisfactory in many cases, but in other classes of cases it may be inadequate. For example, the temperature tolerance for the control of apparatus may be more rigid than usual and difficult of accomplishment by the conventional method and means, and therefore it is an object of the present invention to provide an improved protected apparatus with thermally responsive means which are more sensitive, positive, and dependable in operation.

In other types of apparatus which are to be protected and controlled, the temperature may be affected by another variable besides current flow, for instance, a variable winding constant, and therefore a thermally responsive device that operates exclusively as a direct function of the apparatus current in the conventional manner may not yield a dependable indication of the apparatus temperature under varying values of the apparatus constant for satisfactory protection or control. It is, therefore, a further object of my invention to provide improved protected apparatus and simple thermally responsive means with response characteristics more satisfactorily representative of the temperature of the apparatus to be protected under a varying condition other than that of current flow.

In still other apparatus the safety may not be dependent exclusively on its temperature but on another variable condition as well, such as the duration of the condition, so that the apparatus may tolerate a higher temperature with safety, or may require a lower temperature for safety. In these cases then it is not desirable that the operation of the thermally responsive equipment be based on or furnish an indication of the actual temperature of the apparatus but rather the safety of the apparatus with due allowance for both variables. It is, therefore, another object of my invention to provide improved protective apparatus with thermally responsive simple and economical means adapted to make allowance for the other variable affecting the safety of the apparatus besides the current flow in the apparatus.

In a still other class of apparatus, the second variable, for instance the electromagnetic forces on the windings, may be independent of temperature, and may require operation of the protective device at lower temperatures than that which is permissible for the insulation of the windings.

A still further object of my invention is to provide an improved thermal responsive device.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is a sectional side elevation of an electrical apparatus partly diagrammatic which is provided with an embodiment of my invention; Fig. 2 is a sectional side elevation of the thermally responsive means of the type employed with the apparatus of Fig. 1; Fig. 3 is a top view of the apparatus illustrated in Fig. 2; Figs. 4 and 5 include characteristic curves which will be employed in the description of my invention; and Fig. 6 diagrammatically illustrates the electrical connections of the thermal responsive portion of the apparatus illustrated in Fig. 1.

The invention is illustrated and will be described below in connection with the protection of an electrical apparatus such as a ground fault neutralizer, but it will be understood that my invention may be employed with any other suitable electrical apparatus, such as a transformer. A ground fault neutralizer usually includes a single inductive winding, connected between the neutral of an electrical system and ground, so that ground fault currents in the neutral pass through it. In order to adapt the ground fault neutralizer winding to different conditions on the system, it is generally provided with a plurality of taps. The heating of the apparatus, however, will be affected not only by the magnitude of the fault current, but also by the apparatus constant characteristic or the tap on which the apparatus happens to be operating, that is, by how much of the winding is traversed by the fault current, so that for a given current the hot spot temperature may be different for different tap conditions or for different apparatus constant characteristics. In order to protect such an electrical apparatus a thermally responsive arrangement is provided which gives a temperature indication varying non-linearly with current such that a safe temperature is indicated for any normal current and an unsafe temperature is indicated when the overload condition has existed permissibly long.

Thus the illustrated embodiment of my invention includes a thermally responsive arrangement having a primary winding adapted to carry a load current of the apparatus, such as the ground fault neutralizer, the temperature of which is to be measured and a pair of secondary windings inductively related with the primary winding. The design of these inductively related windings is such that one or both secondary winding currents will vary non-linearly with changes in current above a predetermined value of current flowing through the primary winding. The secondary windings are connected in parallel opposition with a suitable current responsive device such as including a resistor, and thus no resultant current will flow through the resistor so long as the current in the primary winding is below a predetermined value. However, for primary current values above this range, in view of the non-linear characteristics of the inductively associated windings, a resultant current will flow through the resistor. A suitable means such as a temperature responsive device thermally associated with the resistor may be employed so as to control the short circuiting of the ground fault neutralizer upon the attainment of a predetermined temperature condition or give an indication of the current above a predetermined value flowing in the primary winding. Since temperature in electric apparatus is a function of current flowing therethrough, the length of time which this current flows, and the temperature of the cooling medium, the thermally responsive device may be calibrated to give a visual indication of the hot spot temperature of the apparatus above any predetermined value.

Referring more particularly to Fig. 1 of the drawing I have illustrated a protected electrical apparatus such as a ground fault neutralizer 10 including an inductive winding 11 which is immersed in a suitable insulating fluid, the level being indicated by the numeral 12 inside a tank 13. The inductive winding 11 is connected through a conductor or cable 14 to a neutral 15 of an electrical apparatus such as a transformer 16 which is indicated diagrammatically as Y-connected. A plurality of taps 17 are provided for the inductive winding 11 so that a suitable portion of the winding 11 may be connected to ground through the cable 14, and a cable 14' which has one end connected to the movable tap contactor 17' and the other end connected through a bushing 18 to ground indicated diagrammatically at 19. In order to indicate the temperature of the ground fault neutralizer or to disconnect the ground fault neutralizer or short circuit it when the temperature thereof is raised above a predetermined unsafe limit, I have provided an electric indicating device or apparatus which includes a pair of core elements 20 and 21 which are inductively related to the cable 14 which forms the primary winding for the indicating apparatus arrangement. Also, the core members 20 and 21 have secondary windings 22 and 23 thereon or inductively related thereto as will be seen more clearly in enlarged view shown in Fig. 2. In order to provide a suitable arrangement responsive to the current flow through the secondary windings 22 and 23 I provide means including a suitable resistor arrangement 24. This resistor arrangement may take any suitable shape and in Figs. 1 and 2 it will be seen that it is a tubular member having a terminal 25 at one end and a terminal 26 at the opposite end. The terminal 25 is in the form of a plug which closes the adjacent end of the resistor 24 as well as being electrically connected thereto. Surrounding the resistor 24 there is provided a suitable insulating cylinder 27, and within the resistor element 24 I provide a suitable arrangement responsive to the current flow through the resistor 24 such as a temperature responsive element or thermometer bulb 28. An insulating cylinder 29 is also placed between the resistor 24 and the bulb 28. This assembly of insulating cylinder 29, resistor 24, insulating cylinder 27 and the thermometer bulb 28 is immersed in the cooling medium of the electrical apparatus. The insulating cylinders control the rate of heat flow between the resistor and the thermometer bulb and the cooling medium. The bulb 28 may be filled with any suitable fluid which expands when heated, and the bulb may be connected to an arrangement responsive to pressure and therefore indirectly responsive to temperature change such as a pressure operated switch member 30. It is to be understood that temperature responsive means may be provided to either give a visual indication of the current flowing through the resistor 24 or may have contacts to operate any suitable circuit or may be otherwise electrically or mechanically coupled to the circuit suitable for control. In Fig. 1 it will be seen that the switch 30 will operate when a predetermined unsafe temperature exists in the ground fault neutralizer to short circuit the neutralizer through a switch 31 which has an operating coil 32 which will be energized when the contacts of the switch 30 close. Fig. 2 however, shows the bulb 28 connected to an indicator 33 for giving an indication of the temperature.

In order that the thermal responsive device will be responsive to the current flowing through the primary winding when it is above a predetermined value or within any suitable range, the secondary windings 22 and 23 are connected in parallel opposition with the resistor 24, connected across the terminals as will be seen in the diagram of Fig. 6. This may be accomplished in any suitable manner and in the arrangement illustrated in the drawing the windings 22 and 23 have terminals 35, 36, 37, and 38, respectively. Thus the terminal 35 of the winding 22 and the terminal 38 of the winding 23 are connected to the terminal 26 of the resistor 24 by a suitable cable 39, while the terminal 36 of the winding 22 and the terminal 37 of the winding 23 are connected to the terminal 25 of the resistor 24 through a suitable cable 40. It will thus be seen that with this method of connection there will be the same voltage drop across the resistor 24 as across the windings 22 and 23. Thus, when the secondary currents are equal, since the secondary windings are in opposition, the impedance drop in each winding equals the induced voltage so the voltage across the windings and the resistor is zero and no resultant current will flow through the resistor 24. As will be seen in Figs. 2 and 3 the windings have a similar number of turns, or approximately similar characteristics so that current flow in the winding 14 at least up to a predetermined value will produce similar induced currents in the windings 22 and 23.

In order to have the device responsive to current flow in the winding 14 above any predetermined value, the secondary windings 22 and 23 are designed to have non-linear characteristics above this predetermined value. This may be accomplished in any suitable manner such as by making one of the core members saturate before the other saturates. Thus, as is illustrated in Figs. 1 and 2, the core member 20 is made physically smaller than the core member 21 so that it will saturate first. This may also be obtained by employing different magnetic steels in the core members 20 and 21. Thus, since there are an equal number of flux linkages through both of the windings 22 and 23 similar voltages will be induced in these windings so long as the core members 20 and 21 have similar permeabilities. However, as one of the cores saturates increasing values in primary current will produce corresponding increase in values in the secondary winding, and thus when one of the cores begins to saturate the secondary currents will commence to have a non-linear ratio. Another method of obtaining this saturation at different primary currents for the two cores would be to have a different number of turns on the primary and secondary of one set but with the same ratio between the primary and secondary turns.

In order to illustrate the electrical characteristics of my apparatus I have illustrated in Fig. 4 the characteristics of the secondary windings in which secondary current is plotted on the ordinate axis and primary current on the abscissa. Curve 45 gives an indication of the change in current through the secondary winding 23 with changes in primary current while curve 46 gives an indication of the change in current in the secondary winding 22 with changes in primary current. It will be seen that up to a certain value of primary current indicated by the dotted line 47 that the secondary currents in the secondary windings 22 and 23 will be substantially equal and in opposite directions so that no resultant current will flow through the resistor 24. This point indicated by the dotted line 47 may be made any suitable point in relation to the primary and secondary currents by varying the relation between the windings and the iron in the core members 20 and 21. However, as the primary current increases beyond the value indicated by the dotted line 47, the core 20 begins to saturate and the current flowing through the winding 22 therefore increases at a very much less rapid rate as is indicated by the dropping off of the curve 46. The curve 45, however, continues to increase at approximately the same slope and thus the resultant current flowing through the resistor 24 is indicated by the curve 48. This current is then indicated through its heating effect on the thermometer bulb 28, and an indication of this current 48 will be indicated through the indicator 33 which has been suitably calibrated, or the heating effect will operate the switch 30. Any suitable characteristics of the resultant current through the resistor 24 may be obtained by merely correlating the characteristics of the core members 20 and 21, and the inductively associated windings 14, 22, and 23.

In Fig. 5 I have illustrated a characteristic in which one of the cores begins to saturate at the point 50 so as to give a resultant current 51 while the other core begins to saturate at the point 52 so that the resultant current 51 will not continue to rise but will also flatten off. Such characteristics may be employed when it is desired to have the thermal responsive device indicate approximately similar temperature for widely different values of current.

In the application of the present invention to a ground fault neutralizer having different values of current for different tap connections, my improved thermal responsive device will give a suitable indication of the desired hot spot temperature due to the non-linear characteristics of the thermal responsive device. In the ground fault neutralizer, since the current is lower with a higher reactance, the neutralizer is designed with less ventilation with the extended portion of the winding than with the minimum reactance portion of the winding. Thus, for example, 50 per cent current with full windings produces much greater winding rise proportionally than 30 per cent current in the minimum winding. The use of the two current transformer arrangement described gives proper thermal indication with such a variable current in the neutralizer. Thus, referring to Fig. 4 let us assume that the fault current has values within the range $I_1$ and $I_2$ for two opposite extremes of the tap connections, and that a current flows through the resistor 24 which is derived from the fault current and has values $i_1$ and $i_2$ corresponding to the currents $I_1$ and $I_2$. It will therefore be seen that the ratio of $i_2$ to $I_2$ will be sufficiently different to that of $i_1$ to $I_1$, to make the thermal responsive means responsive to the temperature of neutralizer winding exposed to the current $I_1$. However, if a thermal responsive device having linear characteristics, such as that indicated by the dotted line 54, were employed it will be seen that the current which would be obtained with $I_1$ would be larger than that of $i_1$ so that with a linear characteristic, a higher temperature condition would be indicated which would not be indicative of the conditions in the apparatus to be protected.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. An electric apparatus including a primary winding adapted to have a variable current flow therethrough, a pair of secondary windings inductively related to said primary winding, resistor means, means for connecting said secondary windings to said resistor means in parallel opposition so that the current flowing through said resistor means is the difference between the currents of said secondary windings, means for varying the voltages induced in said secondary windings for values of primary current within a predetermined range, and means responsive to the resultant current flowing through said resistor means.

2. An electric apparatus including a primary winding adapted to have a variable current flow therethrough, a pair of secondary windings inductively related thereto, resistor means, means for connecting said secondary windings to said resistor means in parallel opposition so that the current flow through said resistor means will be the difference between the currents of said secondary windings, means for varying the reactance of one of said secondary windings with changes in current flow therethrough with respect to the reactance of the other of said secondary windings, and means responsive to the resultant current flowing through said resistor means.

3. An electric apparatus including a primary winding adapted to have a variable current flow therethrough, a pair of magnetic cores inductively related therewith, each of said cores having a secondary winding thereon, resistor means, means for connecting said secondary windings to said resistor in parallel opposition so that current flow through said resistor means will be the difference between the currents of said secondary windings, said cores having different saturation characteristics so that a difference current will flow through said resistor means, and means responsive to the difference current of said resistor means.

4. An electric apparatus including a primary winding adapted to have a variable current flow therethrough, a pair of secondary windings inductively related thereto, resistor means, means for connecting said secondary windings to said resistor means in parallel opposition so that current flow therethrough will be the difference between the currents of said secondary windings, means for varying the voltages induced in said secondary windings for predetermined values of primary current so that the ratio of currents flowing through said secondary windings are non-linear, and means responsive to the resultant current flowing through said resistor means.

5. An electric apparatus including a primary winding adapted to have a variable current flow therethrough, a pair of secondary windings inductively related thereto, means for varying the voltages induced in said secondary windings for predetermined values of primary current so that the ratio of secondary currents for varying primary current are non-linear, and means connected to said secondary windings in parallel opposition so as to be responsive to the difference between the currents of said secondary windings.

6. A current responsive apparatus including a primary winding adapted to carry a variable load current, a pair of core members inductively related therewith, each of said core members having a secondary winding thereon, resistor means, means for connecting said secondary windings to said resistor in parallel opposition so that current flow therethrough will be the difference between the currents of said secondary windings, one of said core members being adapted to saturate before the other of said cores saturates, and means responsive to the difference current of said resistor means.

7. A current responsive apparatus including a primary winding adapted to carry a variable load current, a pair of core members inductively related thereto, each of said core members having a secondary winding thereon, said secondary windings having substantially similar current characteristics for a predetermined range of load current, one of said core members being adapted to saturate when said load current is outside said range, and means responsive to the difference between the currents of said secondary windings.

8. A temperature responsive apparatus including a primary winding adapted to be connected in series with a device the temperature of which is to be indicated, a pair of core members inductively associated with said primary winding, each of said core members having a secondary winding thereon, resistor means, means for connecting said secondary windings across said resistor means in parallel opposition so that current flow therethrough will be the difference between said secondary currents, said core members having similar characteristics for load currents within a predetermined range and different saturation characteristics for load currents above said predetermined range so that a resultant current will flow through said resistor only when the load current is above said predetermined range, and temperature responsive means thermally associated with said resistor for giving an indication proportional to the change in load current above said predetermined range.

9. In combination, a ground fault neutralizer including a winding provided with a tap changer for selectively varying the number of effective turns of the winding, the current in said winding being an inverse function of its effective number of turns, the turns which are selectively rendered ineffective by said tap changer being less adequately cooled than the remaining turns, thermal protective means for said neutralizer, and means responsive to the current in said neutralizer for energizing said protective means, said current responsive means including means for substantially preventing any energization of said protective means over a predetermined low range of current in said ground fault neutralizer and causing energization of said protective means in more than direct proportion to the ground fault neutralizer current over a predetermined high range of said current.

10. In combination, electrical apparatus having a low range of current which it can carry continuously without overheating and having a high range of current which it can carry for only a short time without overheating, the changes in current from one range to the other being determined by operating conditions outside of the apparatus and the changes in current within each range being determined by selectively adjustable operating conditions within said apparatus, said operating conditions within said apparatus being such that said apparatus dissipates heat better at the low end of each current range than at the high end, thermal protective means for said apparatus, and means for energizing said protective means in response to the current in said apparatus, said response being such that said protective means is substantially unenergized until the current exceeds said low range and for currents in excess of said low range the energization increases in more than direct proportion to increases in said current.

FREDERICK R. JACKSON, JR.